UNITED STATES PATENT OFFICE.

ABRAHAM L. FREEDLANDER, OF AKRON, OHIO, ASSIGNOR TO THE B. F. GOODRICH COMPANY, OF NEW YORK, N. Y., A CORPORATION OF NEW YORK.

PRINTING-ROLLER COMPOSITION.

1,344,631.  Specification of Letters Patent.  Patented June 29, 1920.

No Drawing.  Application filed March 19, 1919. Serial No. 283,504.

*To all whom it may concern:*

Be it known that I, ABRAHAM L. FREEDLANDER, a citizen of the United States, residing at Akron, in the county of Summit and State of Ohio, have invented a certain new and useful Printing-Roller Composition, of which the following is a specification.

This invention has for its object to provide a composition of matter for the ink-distributing rollers of printing presses, which shall be more durable than the gelatin rollers commonly used, and at the same time shall possess other desirable qualities in an equal or higher degree than the ordinary roller. While attempts have been made to employ rubber compositions for this purpose, such attempts, so far as I am aware, have never heretofore proven successful.

As a preferred example of my invention, I have successfully employed the following ingredients in the following proportions by weight:

|  | Per cent. |
|---|---|
| Litharge | 4.0 |
| Slaked lime | 1.5 |
| Sulfur | 3.5 |
| Plantation rubber (first latex) | 42.0 |
| Mineral "rubber" | 3.0 |
| Paraffin | 1.0 |
| Ground "pure gum" vulcanized rubber inner tubes of pneumatic tires | 45.0 |
|  | 100.0 |

The ordinary methods known to rubber manufacturers may be used in compounding and mixing these ingredients. For example, the vulcanized inner-tube material, which represents any high-grade valcanized rubber containing little or no mineral or other fillers besides its sulfur of vulcanization, is broken up on a "refining" mill consisting of a pair of smooth steel rollers, and it and the unvulcanized plantation rubber, together with the "mineral rubber" (which is a well-known filler of an asphaltic nature which softens or becomes plastic by heat) are mixed and sheeted on an ordinary mixing mill. The litharge, lime and sulfur are mixed together and thrown into the batch and at the same time the paraffin wax, liquefied by heat, is poured over them to facilitate their spreading through the batch. The resulting thick sheet or slab is calendered to a thin sheet in the usual way and is then wound onto the core of the printing roller, preferably on a base of vulcanizable hard-rubber compound covered with one or more intermediate layers of vulcanizable connecting rubber compound, over which the sheet of compound prepared as aforesaid is then wound. The roll is wrapped in wet cloths and cured in open steam. The result is an inking roll whose surface has the necessary softness and resiliency, combined with a high degree of durability and other desirable qualities. The roll is smoothed by abrasion before use.

Of the above ingredients, the twice-vulcanized inner-tube rubber performs an important function in the finished printing roller by reason of its springiness and resistance to attack by the linseed oil in the ink. While not readily distinguishable by analysis in the final vulcanized compound, its properties are somewhat different in the respects mentioned from the other rubber. The once-vulcanized plantation rubber in the roller will absorb a small part of the oil in the ink and thus assist in spreading the ink uniformly upon the roll surface without, however, being substantially deteriorated through a long period of service, as it would be if it comprised the whole of the high-grade rubber employed. The mineral rubber and paraffin resist oxidation of the compound. The litharge and the lime act as accelerators in vulcanization, and the sulfur acts in its ordinary capacity as a vulcanizing ingredient. It will be understood that these materials may be considerably varied in their proportions, especially as to the relative quantities, and more or less as to the total combined percentage of the two types of rubber, namely the raw plantation rubber and the vulcanized pure gum. One or more of the lesser ingredients might be omitted, and equivalents may be employed. For example, instead of the litharge, an organic accelerator may be used, and in place of the lime, magnesia can be employed. Antimony sulfid may be used instead of sulfur, hard coal-tar pitch in place of the mineral rubber, other waxes in place of paraffin, and Pará or other rubber in place of plantation rubber. These and other equivalents are included within the scope of my invention, broadly considered.

Printing rollers having a surface layer made of my improved composition remain in good condition after more than a year of hard service, whereas the ordinary gelatin rollers last from one week to two months on the average, according to the class of service. The ink spreads more uniformly and thinner on a roll of this composition than on a gelatin roll, and a substantial saving of ink results. The surface of the roll is much tougher than that of a gelatin roll and cleaning of either the roll or type is less frequently required.

I claim:

1. A resilient ink-distributing roller formed of a vulcanized composition comprising a mixture of previously-vulcanized and previously-unvulcanized rubbers in nearly equal proportions by weight and together constituting the greater part of the composition.

2. An inking roller comprising a soft vulcanized composition containing at least 75% of substantially pure new rubber and high-grade vulcanized rubber in approximately equal proportions, the remaining ingredients including, besides sulfur, a non-oxidizing plastic ingredient.

3. A soft rubber composition for ink distributing rollers comprising a vulcanized mixture substantially as follows; plantation rubber 42%, ground pure-gum vulcanized rubber 45%, mineral rubber 3%, paraffin 1%, litharge 4%, lime $1\frac{1}{2}$%, sulfur $3\frac{1}{2}$%.

In testimony whereof I have hereunto set my hand this 13th day of March, 1919.

ABRAHAM L. FREEDLANDER.